Oct. 7, 1924.
R. KLEIN
1,510,597
PHOTOGRAPHIC SHUTTER
Filed Aug. 4, 1922
2 Sheets-Sheet 1
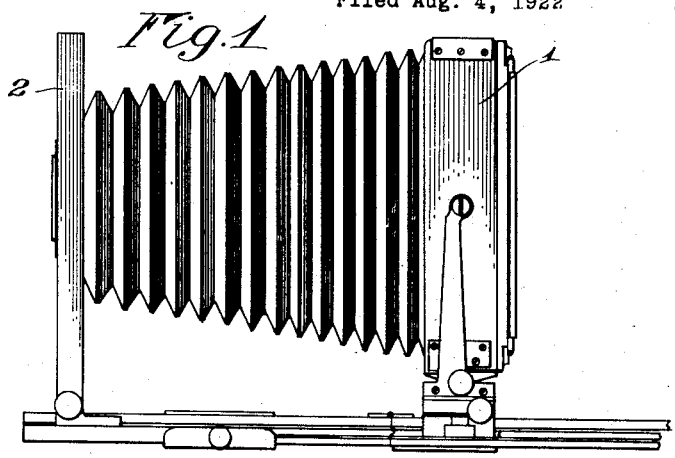
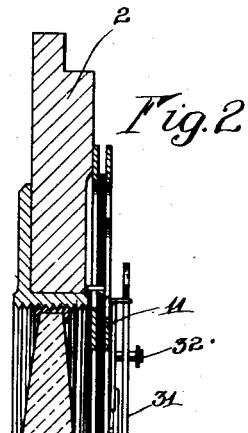
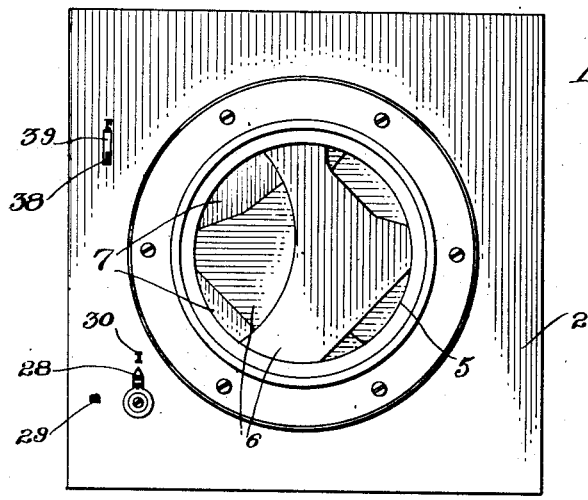
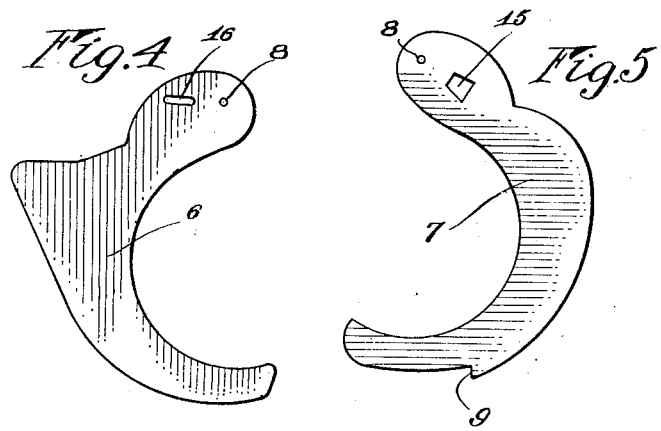
INVENTOR
Rudolph Klein
BY
his ATTORNEYS Oct. 7, 1924.
R. KLEIN
1,510,597
PHOTOGRAPHIC SHUTTER
Filed Aug. 4, 1922   2 Sheets-Sheet 2
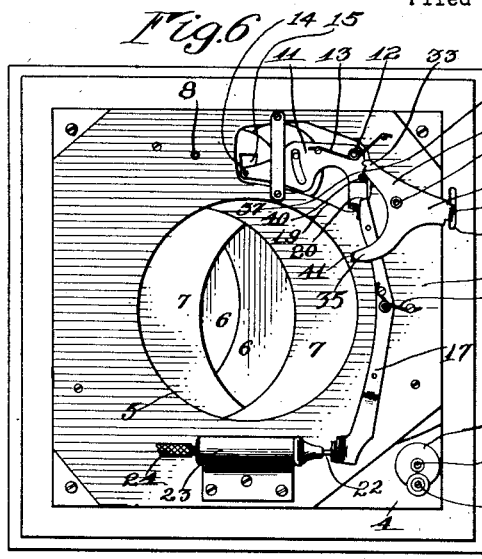
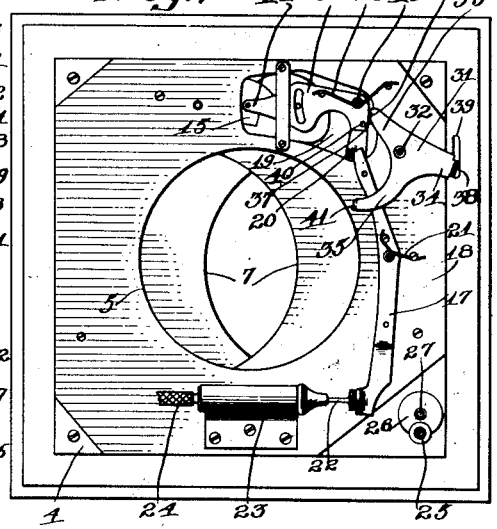
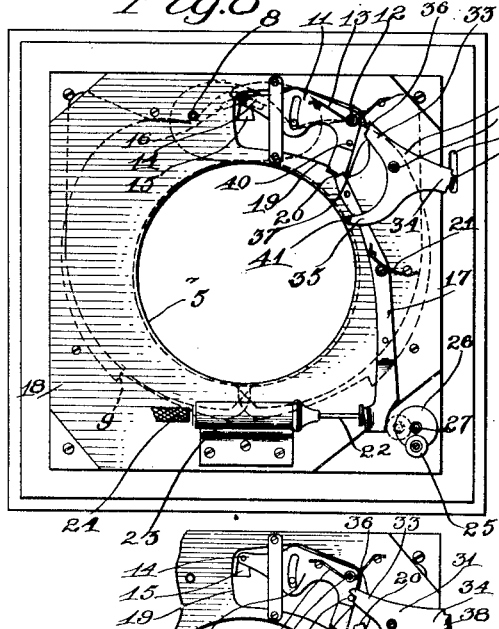
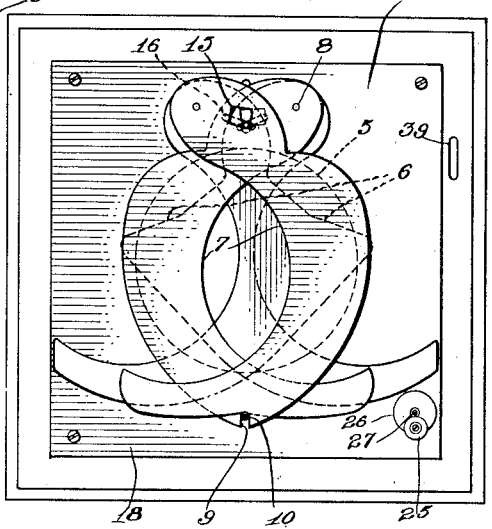
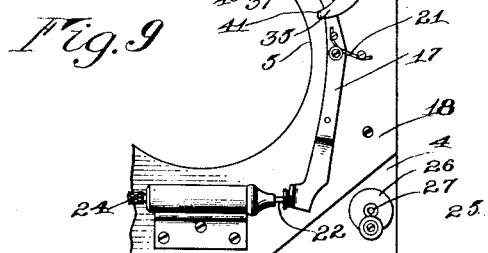
INVENTOR
Rudolph Klein
BY
his ATTORNEYS Patented Oct. 7, 1924.

1,510,597

UNITED STATES PATENT OFFICE.

RUDOLPH KLEIN, OF ROCHESTER, NEW YORK, ASSIGNOR TO ILEX OPTICAL COMPANY, OF ROCHESTER, NEW YORK, A CORPORATION OF NEW YORK.

PHOTOGRAPHIC SHUTTER.

Application filed August 4, 1922. Serial No. 579,620.

*To all whom it may concern:*

Be it known that I, RUDOLPH KLEIN, a citizen of the United States, and resident of Rochester, in the county of Monroe and State of New York, have invented certain new and useful Improvements in Photographic Shutters, of which the following is a specification.

The present invention relates to photographic shutters and an object of the invention is to provide a shutter particularly adapted for studio cameras and having provision whereby substantially all of the operation of the shutter may be controlled from a single actuating device such as a bulb. Another object of the invention is to provide a shutter employing four blades adapted to be opened to produce an exposure aperture which has substantially the same outline from the initial opening to the final opening. Still another object of the invention is to provide a shutter mechanism embodying two pairs of blades, two of which move independently of the other two to provide the initial exposure opening and then all of said blades move simultaneously to provide the final opening, this action being reversed upon the closing of the shutter, that is, all blades moving to produce the initial closing and the initial opening blades moving independently at the final closing. Still another and further object of the invention is to provide a detaining member for the exposure member to permit the focusing of the camera, this detaining member to effect the release of the exposure mechanism.

To these and other ends, the invention consists of certain parts and combinations of parts, all of which will be hereinafter described: the novel features being pointed out in the appended claims.

In the drawings:

Fig. 1 is a face view of a studio camera embodying the present invention;

Fig. 2 is a vertical section through the front board of the camera showing the improved photographic shutter mounted thereon;

Fig. 3 is a face view of the front board;

Fig. 4 is a detail view of one of the initial opening blades;

Fig. 5 is a detail view of one of the final opening blades;

Fig. 6 is a rear view of the front board showing the shutter in closed position;

Fig. 7 is a rear view of the front board showing the shutter partly open;

Fig. 8 is a similar view showing the shutter in open position;

Fig. 9 is a fragmentary view showing the shutter adjusted by focusing; and

Fig. 10 is a detail view of the shutter blades closed.

Referring more particularly to the drawings, 1 indicates a camera having a front board 2 with an exposure opening provided with a lens 3. A plate 4 is secured to the rear face of the front board and has an aperture 5 thereon and over this aperture the shutter mechanism operates. This shutter mechanism, in this instance, embodies a pair of blades 6 and a pair of blades 7. A blade 6 and a blade 7 have a common pivot 8 of which two are provided for the four blades. These pivots are so arranged that the weight of the blades tends to normally hold such blades in closed positions. When in closed position, the blades 6 overlap but do not entirely cover the exposure aperture 5. The blades 7 are spaced apart at their adjacent edges to provide an oval shaped aperture while the other portions of the blades cover those portions of the aperture 5 not covered by the blades 6 so that the four blades when in closed position entirely close the aperture 5. To limit the movement of the blades 7 towards each other each may have a shoulder 9 thereon which cooperates with a stop 10 on the plate 4. The blades 6 are first opened and in opening produce an oval shaped aperture until the opposed edges of the blades substantially align with the opposite edges of the blades 7 after which the blades 7 travel with the blades 6 producing an oval shape aperture until the aperture of the camera is entirely uncovered. In this instance, the blades 6 and 7 travel together until the blades 7 reach their closed positions after which the blades 6 travel independently of the blades 7 until the entire aperture is closed. Any suitable mechanism for effecting this result may be employed.

In the illustrated embodiment there is employed an exposure member preferably in the form of a lever 11 pivoted at 12, and moved in one direction under the action of a spring 13. This lever is mounted on the plate 4 and has one end provided with a pin 14, this pin projecting forwardly through openings 15 in the two blades 7 and slots 16 in the blades 6. The pin 14 by engagement with the walls of the slots 16 causes the two blades 6 to move toward or from each other during the entire movement of the exposure member 11, but the openings 15 permit a lost motion connection between the exposure member and the shutter blades 7, due to the fact that the pin 14 may move in the openings 15 during the initial part of the opening movement and the final part of the closing movement of said exposure member 11.

For operating the exposure member, a master member 17 may be provided which is mounted on a plate 18 secured over the shutter blades in spaced relation to the plate 4 to provide a space between them in which the shutter blades may operate. The plate 18 has an opening 19 through which a laterally flexible extension 20 on the exposure member 11 may operate to be engaged by one end of the master lever 17. A spring 21 acts on the master lever to move the latter in the direction opposed to that in which the master member is moved to effect the opening of the shutter blades. Movement of the master member 17 in the opposite direction may be effected by an actuating means which, in this embodiment, comprises a piston or plunger 22 operating in a cylinder 23 to which air may be supplied through a tube 24 connected to the usual bulb. Pressure on the bulb moves the piston 22 to shift the master member against the action of its spring 21. The upper end of the master member cooperates with the resiliently supported lateral projection 20 and shifts the exposure member to effect the opening of the blades. This shifting of the exposure member continues until the end of the master member rides off the projection 20 owing to the fact that they turn about two different centers and move in different arcs. With the release of the exposure member 11, the blades automatically move to closed position and, when the pressure is released on the bulb, the master member returns to its initial position, slipping over the projection 20 and causing the yielding of the latter, until the master member engages behind the projection 20 for the purpose of permitting the shutter to be held open.

With the end in view of producing bulb exposure, there is provided a stop 25 adapted to cooperate with the master member 17 for limiting the movement of the latter under the action of the actuating plunger 22, as will be seen by referring more particularly to Fig. 8. This stop is in the form of a roller eccentrically arranged on a disk 26 arranged on a shaft 27 which extends through the front wall of the camera and has a pointer 28 on its outer end, the front wall having indications 29 and 30, so that either bulb or instantaneous exposure may be determined from the exterior of the camera. It is apparent that when instantaneous exposure is obtained, this stop 25 will not lie in the path of the master member 17.

With the end in view of holding the shutter blades open so that time exposure may be obtained or that the focusing of the camera may take place, a detent 31 is provided pivoted at 32 and having, in this instance, three arms 33, 34 and 35. The arm 33 has a shoulder 36 thereon and also has a cam surface 37, whereas the arm 34 has a portion 38 extending through a slot 39 in the front wall 2 through which the detent may be manually shifted. For opening the blades this portion 38 is moved upwardly in the slot 39 causing the cam portion 37 to engage a pin or projection 40 on the exposure member 11, shifting such exposure member until the pin or projection engages with the shoulder 36, the exposure member effecting during this shifting the opening of the shutter blades. The arm 35 has a laterally extending portion 41 which lies in the path of the master member 17 when the pin 40 is engaged by the shoulder 36, as will be seen by referring to Fig. 7. When the master member 17 is actuated by the actuating member 22, this pin 41 is engaged by the master member and effects the shifting of the detent upwardly out of the path of the projection 40, thus permitting the blades to close. It will be seen that the photographer is enabled to adjust the shutter to open position from the front part of the camera and is enabled without removing from said front to effect the closing of the shutter through the bulb.

From the foregoing it will be seen that there has been provided a photographic shutter particularly adapted for studio work. The exposure mechanism embodies two pair of blades which open in such a manner as to maintain an aperture which has substantially the same outline throughout the entire opening and closing movement of the shutter. Two of these blades produce an initial opening and thereafter these two blades with the other two effect the final opening of the aperture, the initial closing being effected by the simultaneous movement of the two pairs of blades and the final closing being effected by the independent movement of one pair. A novel connection between the exposure member and the shutter blades is provided for effecting this opening of the shutter blades. Provision is made for effecting the opening of the shutter blades through a detent which is controlled from the front of the camera, this detent also being controlled by the master member.

What I claim as my invention and desire to secure by Letters Patent is:

1. A photographic shutter comprising exposure blades, an exposure member connected with the blades, a detent having a portion arranged to cooperate with the exposure member to open the blades, a portion cooperating with the exposure member to hold the blades open, and a portion through which the exposure member may be manually actuated, and a master member for cooperating with said detent to effect the release of said exposure member.

2. A photographic shutter comprising shutter blades, an exposure member, a three arm detent, one arm cooperating with the exposure member to open the blades and to hold such blades in open position, another arm serving as an actuating arm for the detent, and a master member for cooperation with the exposure member also adapted to cooperate with the third arm of the detent to effect the movement of the latter to release the exposure member.

RUDOLPH KLEIN.